United States Patent
Elliott

[15] 3,654,840
[45] Apr. 11, 1972

[54] FORGED PISTON WITH CIRCUMFERENTIAL GRAIN FLOW AROUND UPPER REGION OF WRIST PIN BORE AND METHOD OF PRODUCING SAME

[72] Inventor: Robert L. Elliott, Pepper Pike Village, Ohio

[73] Assignee: TRW Inc., Cleveland, Ohio

[22] Filed: Sept. 8, 1970

[21] Appl. No.: 70,205

[52] U.S. Cl. ............................................92/222, 29/156.5
[51] Int. Cl. ......................................F16j 1/00, B23p 15/10
[58] Field of Search ..................92/208, 222, 239; 29/156.5, 29/DIG. 17

[56] References Cited

UNITED STATES PATENTS

| | | |
|---|---|---|
| 2,465,792 | 3/1949 | Davis........................................92/208 |
| 2,667,390 | 1/1954 | Watson et al..............................92/239 |
| 2,795,467 | 6/1957 | Colwell...............................29/DIG. 17 |
| 3,010,186 | 11/1961 | Townhill....................................29/156.5 |
| 3,070,414 | 12/1962 | Wilcoxon.............................29/156.5 X |
| 3,237,532 | 3/1966 | Clark...................................29/156.5 X |
| 3,324,772 | 6/1967 | Wittstock..................................92/222 |

Primary Examiner—Edgar W. Geoghegan
Assistant Examiner—Irwin C. Cohen
Attorney—Hill, Sherman, Meroni, Gross & Simpson

[57] ABSTRACT

Heavy duty piston and method of making the same, the piston including confronting wrist pin boss portions, the walls defining the inner extremities of the boss portions being convergingly inclined toward the head of the piston, and the boss portions having recessed portions formed therein of a contour such that the metal grain flow lines surrounding the recessed portions are at least partially circular in the area of the wrist pin holes which are formed in the bosses.

5 Claims, 5 Drawing Figures

PATENTED APR 11 1972    3,654,840
SHEET 1 OF 2
*Fig. 1*
(PRIOR ART)
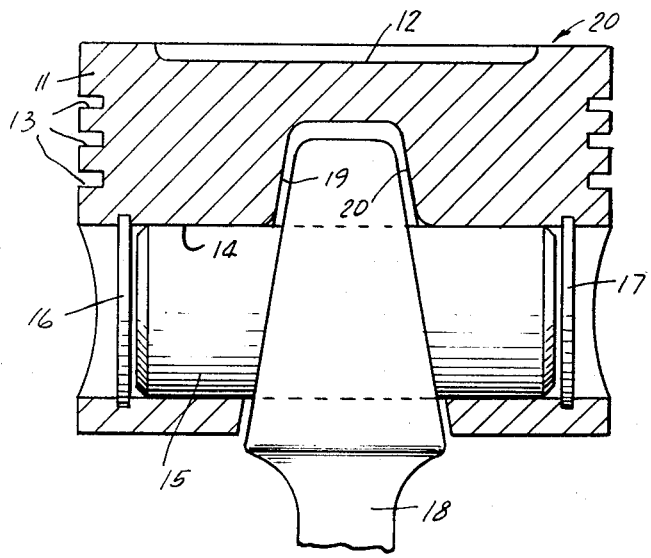
*Fig. 2*
(PRIOR ART)
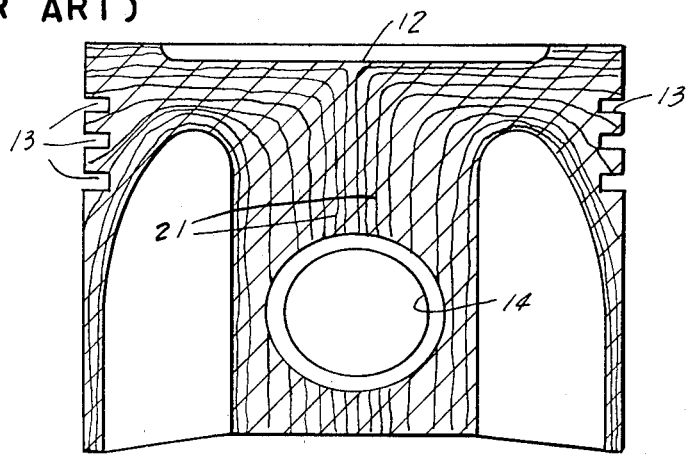
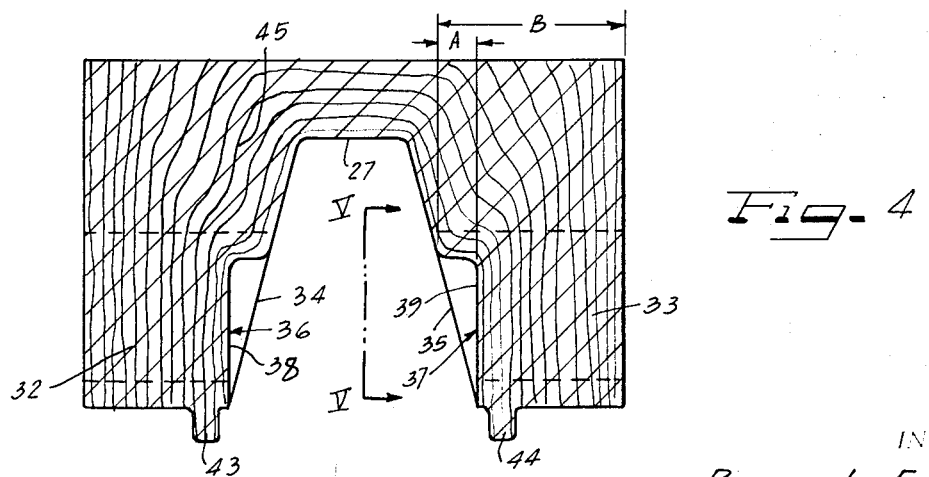
*Fig. 4*
INVENTOR
ROBERT L. ELLIOTT
BY Hill, Sherman, Meroni, Gross & Simpson ATTORNEYS

INVENTOR.
ROBERT L. ELLIOTT

FORGED PISTON WITH CIRCUMFERENTIAL GRAIN FLOW AROUND UPPER REGION OF WRIST PIN BORE AND METHOD OF PRODUCING SAME

BACKGROUND OF THE INVENTION

1. Field of the Invention

This invention is in the field of pistons formed from aluminum alloys by the impact forging process wherein the interior surfaces of the wrist pin bosses are inclined and are provided with a shoulder and recess configuration providing an improved longitudinal grain flow strength in the bosses to oppose wrist pin deflection loads.

2. Description of the Prior Art

The pistons of the present invention are intended for use where very high pressure loads are encountered. In the past, such pistons have been designed with tapered inner opposing faces on the wrist pin bosses to provide more area at the top than at the bottom of the wrist pin bores. This structure was intended to provide more area in both the wrist pin bores of the piston and in the connecting rod to support the pressure load without a proportional increase in weight.

It was found that deflections in the wrist pin itself tended to minimize the effectiveness of this type of design. Under conditions of high pressure loads, hollow wrist pins tend to become elliptical or oval shaped. Both hollow and solid wrist pins deflect or bow under high pressure loads and cause a concentration of the loading of the inner edges of the pin bores in the piston. This type of wrist pin deflection tended to cause failures in the wrist pin bosses manifested as fine fissure type cracks along the inner edges of the wrist pin bores.

A considerable amount of work has been done in the past regraging proper orientation of metal grain flow during impact forging to provide a piston structure of improved strength properties. In Davis U.S. Pat. No. 2,465,792 there is a discussion of improving the strength properties of the head of the piston by utilizing a metal block such that the metal grain flow initially is oriented transversely to the direction of the compressive force of the forging operation so that even with subsequent working, the grain flow is still oriented more or less in its original transverse direction.

The Watson et al. U.S. Pat. No. 2,667,390 describes a piston structure which includes unbroken metal grain flow extending from the head into the pin bosses and skirt and being parallel with the inner and outer peripheral faces.

Colwell U.S. Pat. No. 2,795,467, owned by the assignee of the present application, describes a method for producing a piston from a high silicon content aluminum alloy under conditions such that the grain flow exists parallel to the surfaces of the skirt portion, and extends transversely in the head portion in that it is parallel to the outer surface of that portion.

In Townhill U.S. Pat. No. 3,010,186, also owned by the assignee of the present invention, cast slugs are subjected to endwise impact for kneading the cast crystalline structure of the metal and for initiating a grain band configuration which can be extruded without tearing the metal. The initial treatment of the slug produces a solid cylindrical billet which has a transverse rounded central rib or projection. This rib, when engaged by the impact plunger, provides sufficient extra metal to complete the extrusion of the skirt in regions remote from the pin bosses. By initiating the grain flow formation in the slug, a stronger piston is produced in the final product.

SUMMARY OF THE INVENTION

The present invention provides an improved heavy duty piston which takes advantage of the inherent structural advantages of employing tapered inner opposing faces on the wrist pin bosses, while providing improved strength properties in the vicinity of the bosses so that they can resist more high pressure loads more effectively. Specifically, during the formation of the tapered faces in the boss portion of the piston, there is provided a shoulder and recess arrangement which results in a partially circular recess surrounded by generally circular grain flow. Then, when the wrist pin bore is cut through the tapered faces, the longitudinal grain flow strength opposing pin deflection load is substantially increased by virtue of the grain flow configuration in this area.

BRIEF DESCRIPTION OF THE DRAWINGS

FIG. 1 is a view partly in elevation and partly in cross-section of a typical prior art arrangement of piston having a tapered wrist pin boss arrangement;

FIG. 2 is a fragmentary view in cross-section and partly in elevation illustrating the manner in which prior art structures cause distortion of wrist pin bores under conditions of high loads;

FIG. 4 is a cross-sectional view of the improved piston of the present invention showing the novel configuration of the shoulder and recess portion of the tapered wrist pin bosses.

DESCRIPTION OF THE PREFERRED EMBODIMENTS

Figure 3:
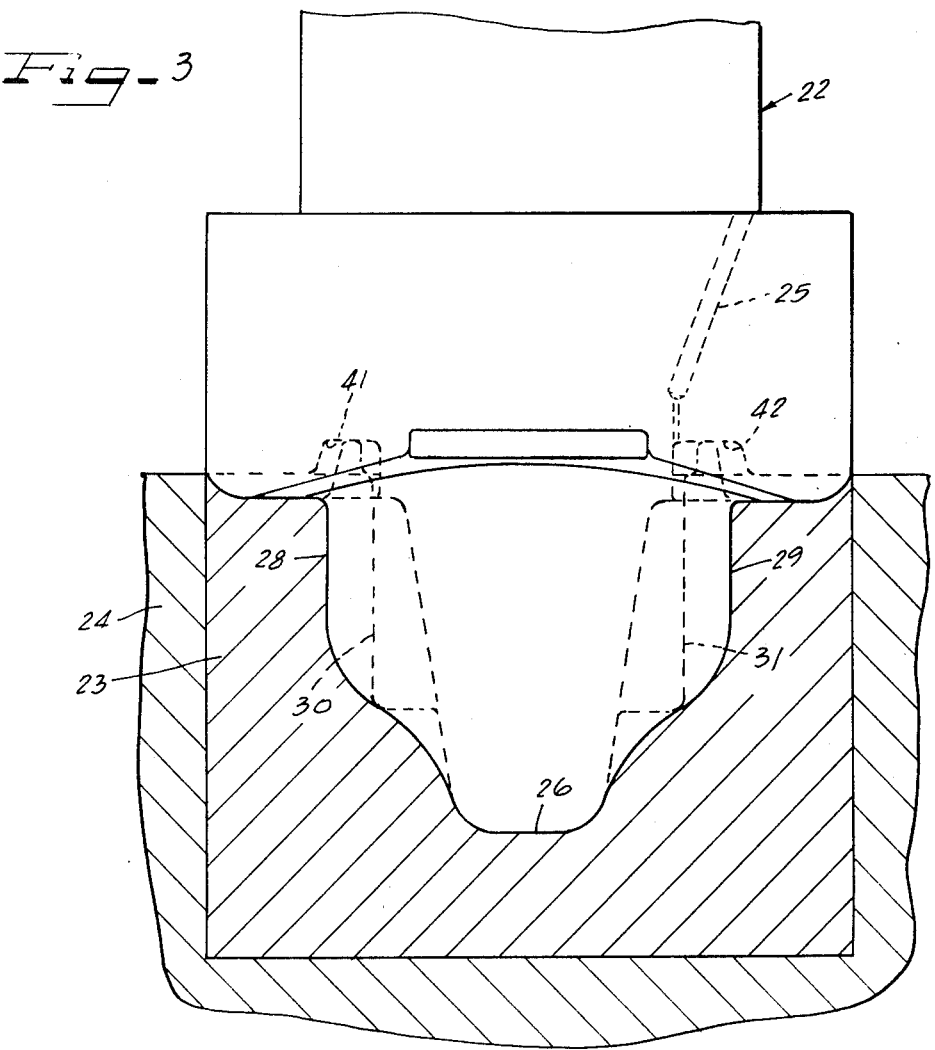
FIG. 3 is a view partly in cross-section and partly in elevation of an improved punch assembly which can be used to produce the improved piston assembly of the present invention.

In FIG. 1, reference numeral 10 indicates generally an aluminum alloy type piston commonly used in the prior art. The piston 10 consists of an integral head portion 11 having a shallow circular recess 12 therein, and being provided with the usual piston ring grooves 13. The piston includes a wrist pin bore 14 in which a wrist pin 15 is received, confined against extensive lateral movement by the provision of opposed snap rings 16 and 17 tightly received within the wrist pin bore. The wrist pin 15 is connected to a connecting rod 18 in the usual manner.

The inner faces of the wrist pin bores have convergingly tapered surfaces 19 and 20 which converge toward the head of the piston. Through this type of design, more area is provided at the top than at the bottom of the wrist pin bores. The provision of more area in both the wrist pin bore of the piston and in the connecting rod provides an increased ability to resist pressure loads without a proportional increase in the weight of the piston. However, with the type of assembly shown in FIG. 1, it is frequently found that failures would commence due to wrist pin deflection under pressure loads such that the wrist pin bore 14 would become oval or elliptical as best shown in FIG. 2 of the drawing. This would tend to fracture or split the metal parallel to the grain flow lines which are indicated at reference numeral 21 in FIG. 2. Since the loads caused by the deflection or bowing of the wrist pin are generally transverse to the direction of the grain flow 21, this type of design does not take maximum advantage of the inherent strength of the material.

The present invention provides a grain flow structure in the vicinity of the bosses which is generally circular around the wrist pin bore and therefore better able to resist the concentration of loading which occurs at the inner edges of the pin bores in the piston. In FIG. 3, there is illustrated a punch and die assembly of a type which can be used for the purposes of the present invention. A punch 22 is shown in the process of impact forging a blank 23 of an aluminum alloy piston material confined in a die 24. The forged slug after removal from the die is illustrated in FIG. 4 of the drawings. The punch 22 has a venting passage 25 formed therein and has an arcuate portion 26 which forms an arcuate portion 27 (FIG. 4) beneath the head portion of the piston. The arcuate portion 26 of the punch merges with a pair of relatively wide arcuate punch surfaces 28 and 29 which form the opposed recesses at the skirt portion of the piston. Between the two arcuate portions 28 and 29 there is provided a pair of shoulders 30 and 31 which form the metal in the area of the wrist pin bosses 32 and 33

Figure 5:
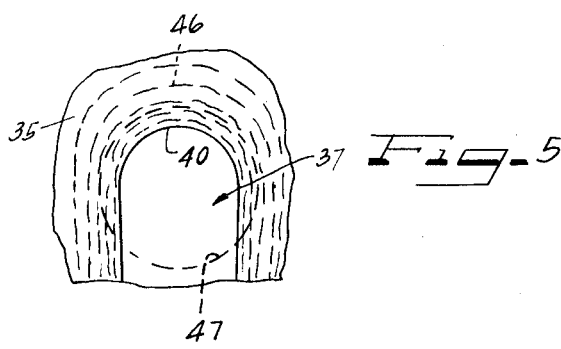
FIG. 5 is a view taken substantially along the line V—V of FIG. 4, showing the grain flow configuration in the area surrounding the region in which the wrist pin boss is to be provided.

(FIG. 4). As illustrated best in FIG. 4, the punch provides the metal with convergingly inclined interior boss forming walls 34 and 35 and also provides opposed recessed portions 36 and 37, recessed portions 36 and 37 having their greatest depth toward the head of the piston, and having generally parallel side walls 38 and 39 extending downwardly therefrom. As best seen in FIG. 5, recessed portions 36 and 37 may have a generally semi-circular configuration 40 at the maximum depth of the recess, and a decreasing depth from the semi-circular top portion to the bottom of the recess.

The punch 22 may also be provided with internal slots 41 and 42 which serve to provide arcuate, diametrically opposed ribs 43 and 44 in the forged piston as shown in FIG. 4. These ribs may be used for locating the piston properly in subsequent machining operations or for balancing purposes. They may remain in the finished piston or be removed during the subsequent machining of the ring grooves and wrist pin bores, as dictated by the design of the piston.

Reference to FIG. 4 will indicate that the grain flow 45 in the vicinity of the wrist pin bosses generally follows the contour of the various recesses provided by the action of the punch 22. At the semi-circular portion of the recesses, as indicated in FIG. 5, the grain flow is generally circular as indicated by the grain flow configuration 46 surrounding the deepest part of the recess. The grain flow in the skirt portions is generally parallel to the surfaces thereof. The wrist pin bore 47 is then machined through the forged slug as indicated by the dashed lines in FIG. 5.

For best results, it has been found that the depth of the recessed portions 36 and 37 at their maximum dimension indicated at reference letter "A" in FIG. 4, should be at least 20 percent of the radial distance from the outer diameter of the forging to the inner surface of the pin boss at the upper edge of the wrist pin bore, a dimension indicated at reference letter "B" in FIG. 4, or a minimum of three-eighths of an inch.

The new piston configuration provides substantially greater strength to oppose pin deflection loads than could be achieved in prior art designs where the grain flow pattern follows the longitudinal extent of the pin bosses and is more or less parallel to the inner and outer surfaces of the bosses. By using a circular grain flow pattern in the region of the wrist pin bore, as in the present invention, it was found that tendency to form fissure type failures is substantially reduced.

I claim as my invention:

1. A piston structure composed of an aluminum alloy and having an integral head portion, ring flange portions, confronting wrist pin boss portions having coaxial wrist pin holes extending therethrough and a skirt portion, said boss portions having diametrically opposed recessed portions at the inner surfaces thereof through which said wrist pin holes extend, said recessed portions having a greater radial depth at the head end of the piston than at their opposite ends, the walls defining said recessed portions being convergingly inclined toward said head portion, the metal grain flow surrounding said wrist pin holes being substantially circular.

2. The piston structure of claim 1 in which the grain flow in said skirt portion is generally parallel to the surfaces thereof.

3. The piston structure of claim 1 in which the recessed portions in said boss portions have generally semi-circular top portions nearest the head of the piston and generally parallel side walls extending downwardly therefrom.

4. The piston structure of claim 1 in which the depth of the recessed portions at their maximum is at least 20 percent of the distance from the top of the recessed portion to the outer periphery of the piston.

5. The method of forming a piston which comprises impacting a slug of aluminum alloy to cause reverse flow of metal and thereby form a head portion, a ring flange portion, and diametrically opposed wrist pin boss portions, flowing the metal in the wrist pin boss portions in a circular pattern during such impacting, and thereafter forming wrist pin holes through said boss portions so that the resulting holes have a circular grain pattern in partially circumscribing relation to said wrist pin holes.

* * * * *